J. S. WILLIAMS.
DEMOUNTABLE WHEEL EQUIPMENT.
APPLICATION FILED DEC. 15, 1917. RENEWED NOV. 7, 1919.
1,340,199.
Patented May 18, 1920.
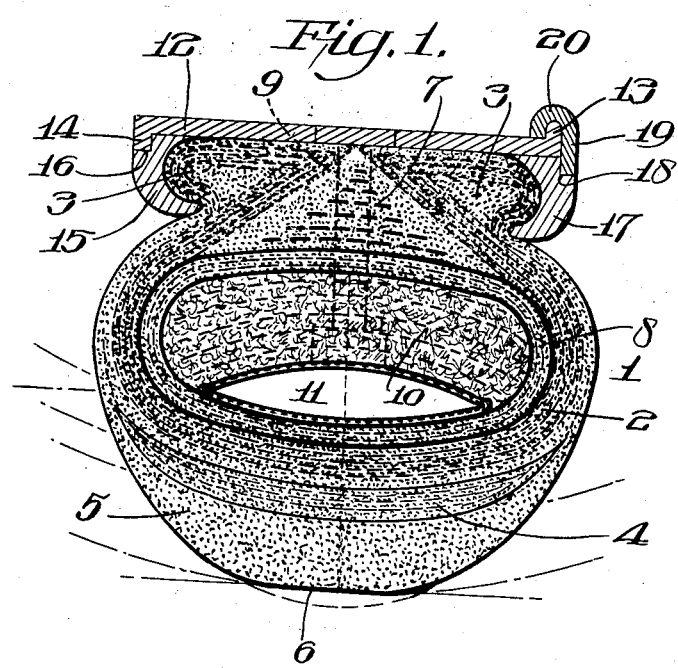
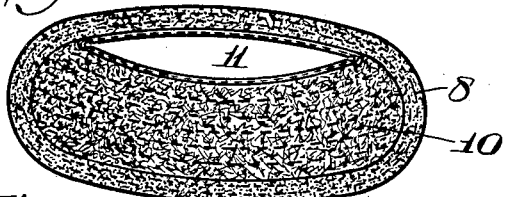
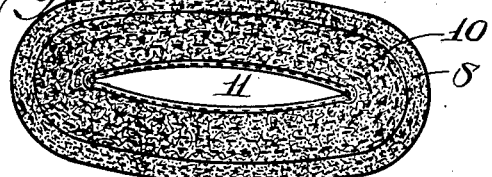
INVENTOR
Joseph S. Williams,
BY Niedersheim &VanDunk
ATTORNEYS

UNITED STATES PATENT OFFICE.

JOSEPH S. WILLIAMS, OF PHILADELPHIA, PENNSYLVANIA.

DEMOUNTABLE-WHEEL EQUIPMENT.

1,340,199. Specification of Letters Patent. Patented May 18, 1920.

Original application filed January 19, 1911, Serial No. 603,552. Divided and this application filed December 15, 1917, Serial No. 207,231. Renewed November 7, 1919. Serial No. 336,474.

*To all whom it may concern:*

Be it known that I, JOSEPH S. WILLIAMS, a citizen of the United States, residing at Philadelphia, county of Philadelphia, State of Pennsylvania, have invented a new and useful Demountable-Wheel Equipment, of which the following is a specification.

My present invention is a division of my copending application Serial No. 603,552, filed Jan. 19th, 1911, and consists of a novel construction of a demountable wheel equipment wherein by a lateral and radial compression of the tire seating a tensile belt is secured in tension or its tension increased or maintained around a flexible and resilient annular truss, the various elements being constructed and arranged in a novel manner in order to render the equipment load sustaining and non-collapsible and to provide for the proper range of resilient movements without subjecting the construction to abnormal strains.

Other salient features and objects of my invention will hereinafter more clearly appear in the detailed description of my invention.

For the purpose of illustrating my invention, I have shown in the accompanying drawings forms thereof which are at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a transverse section of a resilient wheel equipment embodying my invention.

Figs. 2 and 3 represent respectively transverse sections of core members embodying my invention.

Similar numerals of reference indicate corresponding parts in the figures.

Referring to the drawings, 1 designates a demountable wheel equipment embodying my invention and which may be of the inwardly opening type or of the closed type. In other words, the tire may be cured to form a unit of construction or the core or cushion may be removable. 2 designates a tension belt of rubber and reinforcing material such as for example fabric, said belt being disposed outwardly of the major axis in cross section, in flattened arch formation with a curved formation at the sides extending to terminal seating parts 3 which are illustrated as having the formation of the clencher type of beads. Juxtaposed to the belt 2 is an annular flexible reinforcement 4 illustrated as consisting of fabric and rubber which is transversely disposed substantially concentric with the belt 2 and aids in preventing circumferential elongation of such portion of the tire. 5 designates the tread, the road contacting portion of which is disposed mainly within a circle formed by a radius of one-half the transverse diameter of the tire and preferably having its road contacting surface flattened, as indicated at 6. 7 designates a compressible annular seating formed of fabric and rubber and contributing with the belt 2 to form an annular core-space. Within the core space is a fluid tight tube 8 of any desired number of layers of fabric and rubber vulcanized together and into which air under pressure or mobile material can be introduced through the valve tube 9. If desired, a flexible and resilient annular truss 10 of fabric and rubber may be secured within the tube 8 and this truss may be provided with a fluid tight tube 11 which provides for flexing movements of the tire when in service. This tube 11 is adapted to have introduced into it mobile material or air under a desired pressure.

The cores seen in Figs. 2 and 3 may be substituted for that seen in Fig. 1 and the main difference in their constructions is the location of the inner fluid tight tube forming a part of them. In Fig. 2 the tube 11 is shown at the inner portion of the core. In Fig. 3 the tube is shown centrally of the core and the fabric reinforcement of the core completely surrounds the tube. The tubes are shown as having their wall reinforced by fabric.

12 designates a rim member of the demountable equipment which may or may not be a fixed rim and which at one side is provided with an inwardly extending flange 13 and at its opposite side with an outwardly projected flange 14.

15 designates a clencher ring which is angularly cut as at 16 to provide for its interlocking with the flange 14. 17 designates a second clencher ring which is angularly cut away, as at 18, to provide for the interlocking with it of the locking ring 19 which is provided with a hook portion or overhanging flange 20 to lock with the flange 13 of the rim member 12. When the tire is assembled the seating 7 is laterally compressed between the tire beads and the tension of the tension belt against the truss is increased and maintained.

The seating parts of the tire are compressed both laterally and radially to secure the belt 2 around the truss 10 in tension and to maintain such tension. The belt 2 is in tension laterally to restrain lateral elongation of the tire and the belts 2 and 4 are in tension circumferentially to restrain circumferential elongation of the tire. This tension is maintained by the core and the tire support and can be increased by the introduction into the tube 11 of mobile material under any desired pressure.

The truss 10 supports the curved side portions of the tension belt 2 and substantially fills the space between such portions and is preferably disposed in such a manner as to transversely truss such curved side portions. The tire may be vulcanized into a unit of structure or the seating portion 7 which serves as a trussing portion may be detachable if desired as well as the tube 8 and the truss within it.

It will be seen that the terminals and inner seating part of the annular body and the flexible tension belt and the annular and transverse resilient trussing support for the belt, are all designed to be formed and combined so that the terminals and seating parts of the body can be firmly secured upon the inner annular seating support or rim. When the terminals and seating are free laterally and locked in position, there will be an increase of tension upon the belt about the inner trussing support therefor.

The tread encircling such annular body of tire construction will therefore be maintained in resiliently spaced and non-collapsible relationship about the seating and axis of the body and the periphery of the wheel.

When such construction is inflated with air or other suitable mobile content, the entire tire body is placed in universal tension and is universally resilient outwardly of the inner seating portions of the body.

It will now be apparent that I have devised a novel and useful construction of a demountable wheel equipment, which embodies the features of advantage enumerated as desirable in the statement of the invention and the above description, and while I have, in the present instance, shown and described preferred embodiments thereof which will be found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A demountable wheel equipment, comprising an annular, resilient body, provided with an annular, flexible tension belt disposed in flattened arch formation outwardly of its major axis in cross-section, with curvatures at the sides merging into annular tire beads, a yielding trussing support extending annularly between said beads, an annular resilient portion within said tension belt, and means to move said beads laterally toward said support to secure said belt in tension around said resilient portion.

2. A demountable wheel equipment, comprising an annular resilient body, provided with an annular, flexible tension belt which outwardly of its major axis in cross-section is transversely disposed in flattened arch formation and extends with curvatures at the sides to annular terminals, a yieldable trussing support maintaining said terminals in spaced relationship, and contributing with said belt to form a space for a cushion, an annular resilient cushion within said space, supporting said curvatures and the formation of the tension belt, and means to move said terminals laterally and radially to maintain said belt in tension around said resilient cushion.

3. A demountable wheel equipment, comprising an annular resilient body, provided with an annular, flexible tension belt which outwardly of its major axis in cross-section is transversely disposed in flattened arch formation and extends with curvatures at the sides to annular terminals, a yieldable trussing support maintaining said terminals in spaced relationship, and contributing with said belt to form a space for a cushion, an annular resilient cushion within said space supporting said curvatures and the formation of the tension belt, means to move said terminals laterally and radially to maintain said belt in tension around said resilient cushion, and said cushion having means to receive mobile material to increase the tension of said belt.

4. A demountable wheel equipment, comprising an annular resilient body, provided with an annular, flexible tension belt which outwardly of its major axis in cross-section is transversely disposed in flattened arch formation and extends with curved side walls to inner annular terminals, a compressible annular seating of fabric and rubber disposed between said terminals and contributing with said belt to form an annular chamber to receive a cushion, an annular resilient cushion, engaging the inner faces of said belt and the outer face of said support, supporting said curvatures and trussing the chamber therebetween and forming with said belt an annular, non-collapsible, resilient body, and means to move said terminals laterally toward each other to compress said trussing support and to secure said belt in tension around said cushion.

JOSEPH S. WILLIAMS.

Witnesses:
C. D. McVay,
M. E. Byrne.